(12) United States Patent
Dumont et al.

(10) Patent No.: US 9,411,460 B2
(45) Date of Patent: Aug. 9, 2016

(54) METHOD AND DEVICE FOR DETECTING THE ORIENTATION OF AN AREA OF THE BODY OF AN INDIVIDUAL PLACED ON AN APPOSITION AREA OF A BIOMETRIC SENSOR MOUNTING

(75) Inventors: Denis Dumont, Paris (FR); Edouard Da Silva, Paris (FR)

(73) Assignee: MORPHO, Paris (FR)

( * ) Notice: Subject to any disclaimer, the term of this patent is extended or adjusted under 35 U.S.C. 154(b) by 977 days.

(21) Appl. No.: 13/579,345

(22) PCT Filed: Feb. 15, 2011

(86) PCT No.: PCT/EP2011/052242
§ 371 (c)(1),
(2), (4) Date: Oct. 24, 2012

(87) PCT Pub. No.: WO2011/101357
PCT Pub. Date: Aug. 25, 2011

(65) Prior Publication Data
US 2013/0147726 A1     Jun. 13, 2013

(30) Foreign Application Priority Data
Feb. 17, 2010  (FR) .................................... 10 51123

(51) Int. Cl.
*G06K 9/00* (2006.01)
*G06F 3/041* (2006.01)

(52) U.S. Cl.
CPC ............ *G06F 3/0416* (2013.01); *G06K 9/0012* (2013.01); *G06K 9/00013* (2013.01); *G06K 9/00912* (2013.01); *G06K 2009/0006* (2013.01); *G06K 2009/00932* (2013.01)

(58) Field of Classification Search
None
See application file for complete search history.

(56) References Cited

U.S. PATENT DOCUMENTS

| 9,060,688 | B2 * | 6/2015 | Rowe |
| 2008/0037001 | A1 | 2/2008 | Yokoyama et al. |
| 2010/0168585 | A1 * | 7/2010 | Fujii et al. ..................... 600/476 |

FOREIGN PATENT DOCUMENTS

| DE | 103 47 316 | 5/2005 |
| FR | 2 913 788 | 9/2008 |

OTHER PUBLICATIONS

English translation of International Preliminary Examination Report for PCT/EP2011/052242, Oct. 5, 2012.
International Search Report for PCT/EP2011/052242, mailed Jun. 7, 2011.
Non-Eng Written Opinion for PCT/EP2011/052242, mailed Jun. 7, 2011.

* cited by examiner

*Primary Examiner* — Vikkram Bali
(74) *Attorney, Agent, or Firm* — Nixon & Vanderhye P.C.

(57) ABSTRACT

The present invention concerns a method and device for detecting the orientation of an area (DO) of the body of an individual placed on an apposition area (AP) of a biometric sensor mounting (P) designed to form a first image (I1) of the area (DO) of the body by total reflection of radiation on the apposition area (AP), and a second image (I2) of the area (DO) of the body from radiation able to pass through the tissues of the body and to be reflected on haemoglobin. The method is characterized in that it comprises

- a step of determining in a reference frame firstly the longitudinal axis (A) of the area of the body depicted in the first image and secondly two longitudinal edges (B1, B2) of the area of the body depicted in the second image, and
- a step of determining the orientation of the area of the body with respect to the mounting from the measurement of the relative positions of the two edges (B1, B2) and the axis (A) thus determined in the reference frame.

The present invention also concerns a biometric sensor and an installation for identifying an individual comprising such a device.

12 Claims, 4 Drawing Sheets

METHOD AND DEVICE FOR DETECTING THE ORIENTATION OF AN AREA OF THE BODY OF AN INDIVIDUAL PLACED ON AN APPOSITION AREA OF A BIOMETRIC SENSOR MOUNTING

This application is the U.S. national phase of International Application No. PCT/EP2011/052242 filed 15 Feb. 2011 which designated the U.S. and claims priority to FR 10/51123 filed 17 Feb. 2010, the entire contents of each of which are hereby incorporated by reference.

The present invention concerns a method for detecting the orientation of an area of a body of an individual placed on an apposition area of a biometric sensor mounting designed to form a first image of the area of the body by total reflection of radiation on the apposition area, and a second image of the area of the body from radiation able to pass through the tissues of the body and to be reflected on haemoglobin.

Equipment is known for identifying an individual by means of the reading of a body print and the venous network taken on an area of his body and, in particular, by means of the reading of a fingerprint and the venous network taken on the last phalanx of one of his fingers.

In this type of equipment, the individual must first of all proceed with the prior registration of his biometric data, in this case the body print and the venous network of an area of his body, by placing an area of his body on an apposition area of a biometric sensor mounting then designed to form two images optically. One of these images, which represents the body print of the area of the body of the individual, is obtained by total reflection of radiation on the apposition area, and the other image, which represents the venous network of the area of the body of the individual, is obtained from radiation able to pass through the tissues of the body and be reflected on haemoglobin. Direct vision is sometimes spoken of.

Figure 1A:
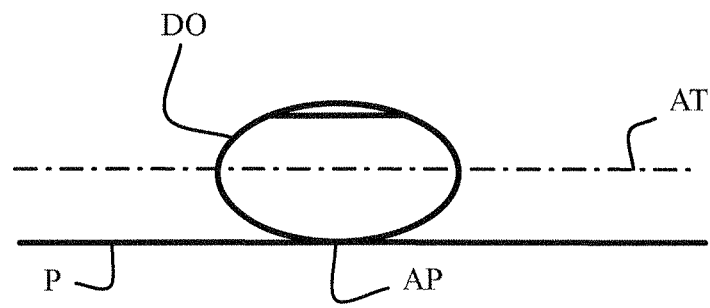

FIG. 1a shows a front view of an area DO of the body of an individual, in this case the last phalanx of one of his fingers, placed on an apposition area AP of a mounting P of a biometric sensor according to a predetermined so-called reference position. In this case the last phalanx of the finger is placed flat on the mounting, that is to say the transverse axis AT of the finger is substantially parallel to the mounting P. The image of the body print and the image of the venous network are then formed optically during the prior registration phase.

Once the prior registration phase is effected, each time this individual must be identified, in order for example to access a site or machine with restricted access, he must once again place the same area of his body on the apposition area of the biometric sensor mounting, which then forms two new images of the area of the body, and the individual is then identified by comparing the newly formed images, or data extracted from these images, with those formed during the prior registration phase.

Figure 1B:
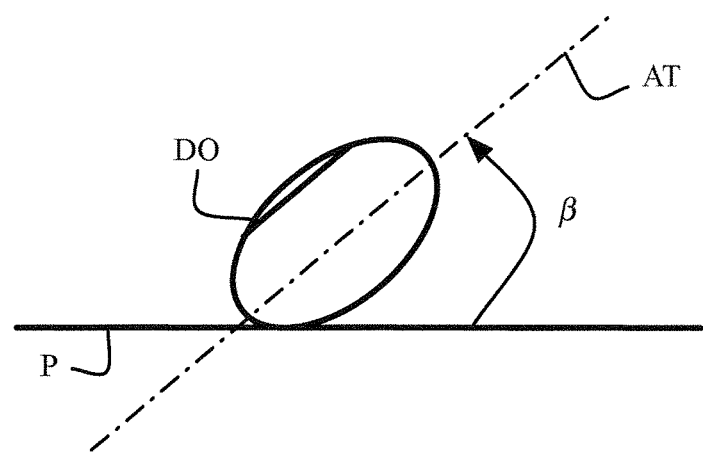

When the individual must identify himself, a new image of the body print and a new image of the venous network are formed. It may then happen that the individual does not place his finger on the apposition area of the mounting at the reference position, in this case completely flat as illustrated in FIG. 1b. In other words, the transverse axis AT and the mounting P form a non-zero angle β, sometimes referred to as the placing angle. This faulty positioning of the finger, in this case the faulty orientation of the finger placed on the mounting, may then give rise to a representation on the images of the body print and/or of the venous network that is deformed to the point of no longer corresponding to the one represented on the images formed during the prior registration phase, then causing an error in identification of the individual.

The problem solved by the present invention is to provide a method that makes it possible to detect the orientation of an area of the body of an individual placed on an apposition area of a mounting of a biometric sensor designed to form a first image of the area of the body by total reflection of radiation on the apposition area and a second image of the area of the body from radiation able to pass through the tissues of the body and be reflected on haemoglobin.

To this end, the present invention concerns such a method, which is characterised in that it comprises a step of determination, in a reference frame, firstly of the longitudinal axis of the area of the body represented on the first image, and secondly two longitudinal edges of the area of the body represented on the second image, and a step of determining the orientation of the area of the body with respect to the mounting from the measurement of the relative positions of the two edges and the axis thus determined in the reference frame.

Thus, when the area of the body is once again placed on the apposition area of the biometric sensor mounting, the method makes it possible to detect the orientation of this area of the body by determining an offset between the body print and the venous network shown on the two newly formed images.

According to one embodiment, the measurement of the relative positions of the two edges and of the axis is the ratio between two distances each measured in the reference frame between the axis and one of the two edges.

This embodiment is particularly simple to implement since the two images formed on the image plane of the biometric sensor are linked by the same reference frame and the distances can then easily be measured directly on these images by counting the pixels that separate each of the edges and the longitudinal axis determined from these two images.

According to one embodiment, an orientation of the area of the body with respect to the mounting is detected when the two distances are not equal to each other and the sign of the orientation is then given by the sign of the difference between these two distances.

This embodiment is advantageous in particular during a prior registration phase in order to determine a reference position of the area of the body on the apposition area that provides a faithful representation of the whole of the body print. This mode is also advantageous for correcting the defect in placing of the area of the body on the apposition area, as will be seen below.

According to one embodiment, an orientation of the area of the body with respect to the mounting is detected when the two distances are not equal to two other distances measured previously and representing a reference position of the area of the body with respect to the mounting.

This embodiment is advantageous since it makes it possible to compare the orientation of the area of the body with respect to the biometric sensor mounting with a reference position previously registered.

According to one embodiment, the value of the placing angle formed between the transverse axis of the area of the body and the mounting is determined from a look-up table between pairs of distances measured and placing angles predetermined empirically.

According to one embodiment, the method also comprises a step of correction of the representation of the area of the body carried by the first image from the sign and value of the placing angle thus determined.

According to one embodiment, the method also comprises a step for indicating to the individual whether the orientation of the area of his body with respect to the mounting is correct for his identification.

According to one of its hardware aspects, the present invention concerns a device comprising means for implementing one of the above methods.

According to another of its hardware aspects, the present invention concerns equipment for identifying individuals that comprises either a biometric sensor integrating a device as above or a biometric sensor and an aforementioned device that are separate.

Figure 2A:
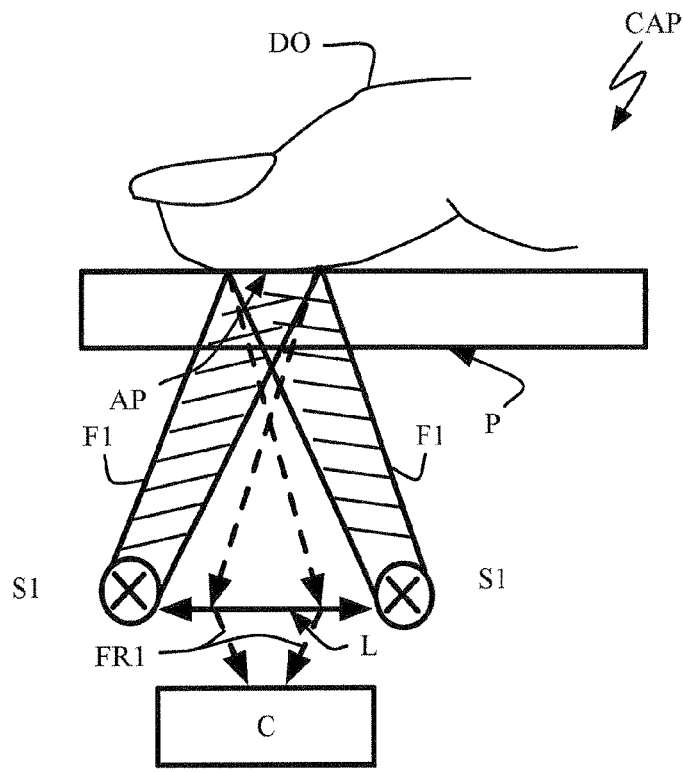
Figure 2B:
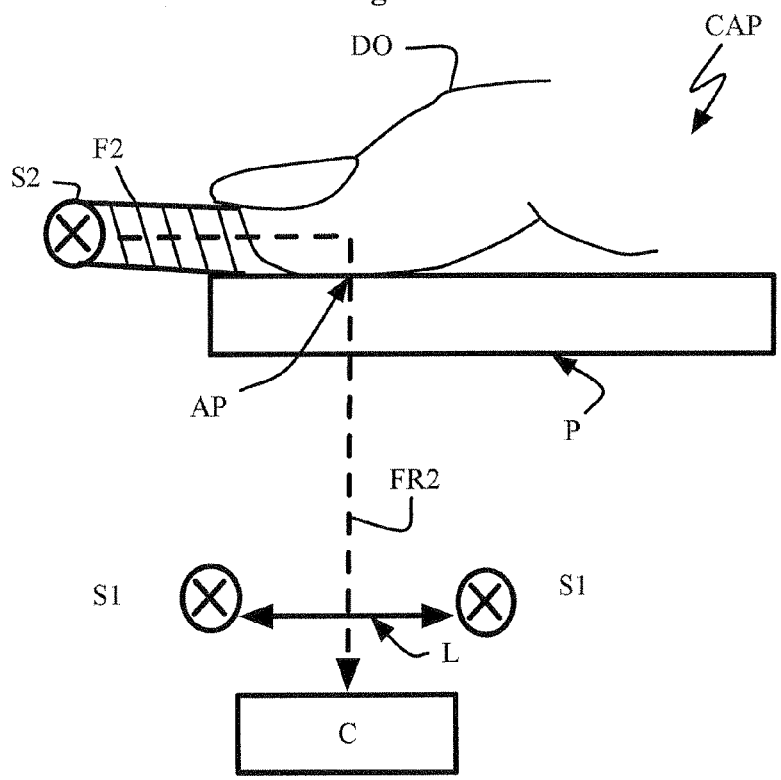
Figure 3:
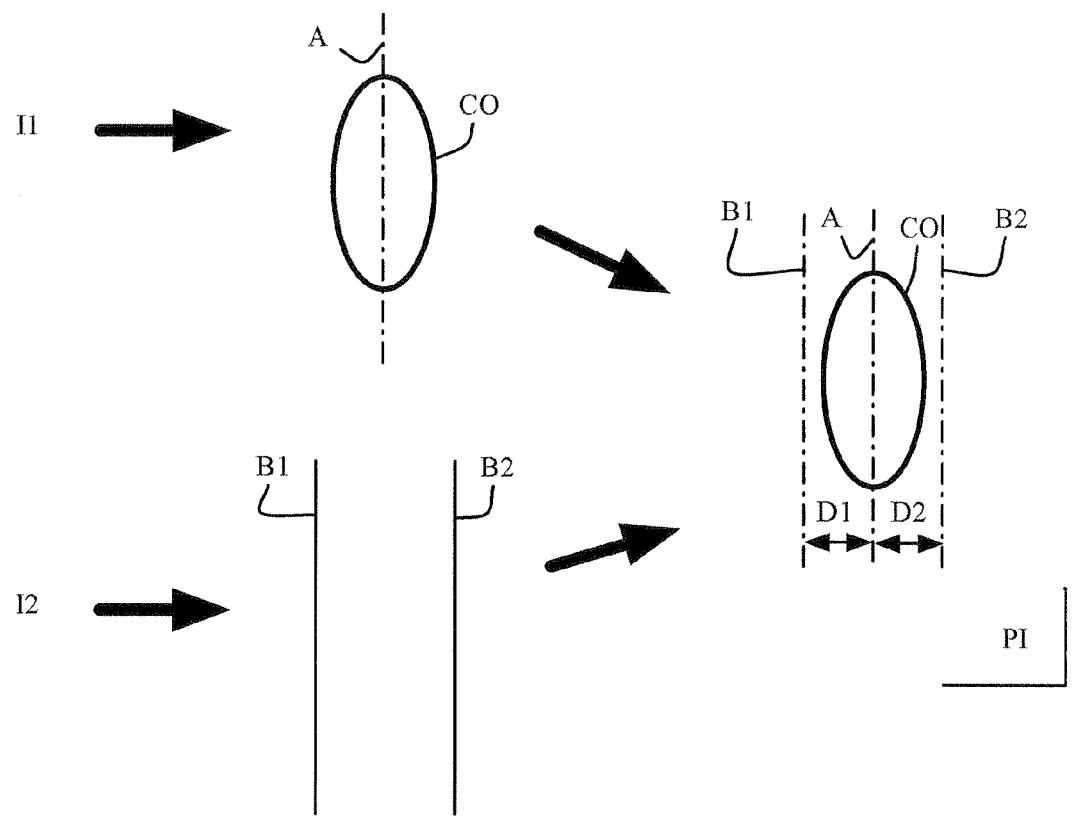
Figure 4:
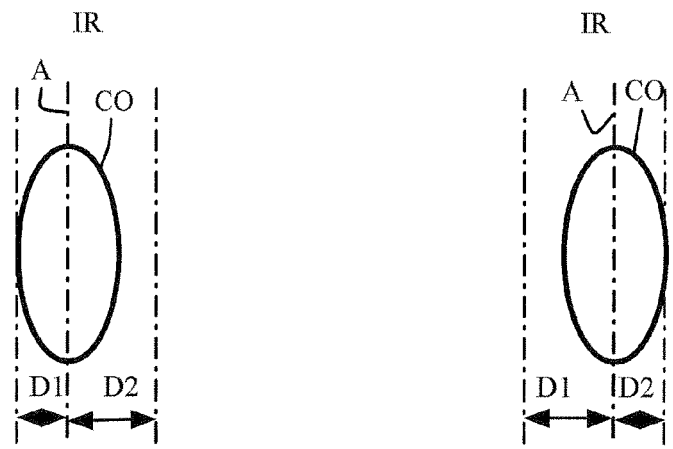
Figure 5:
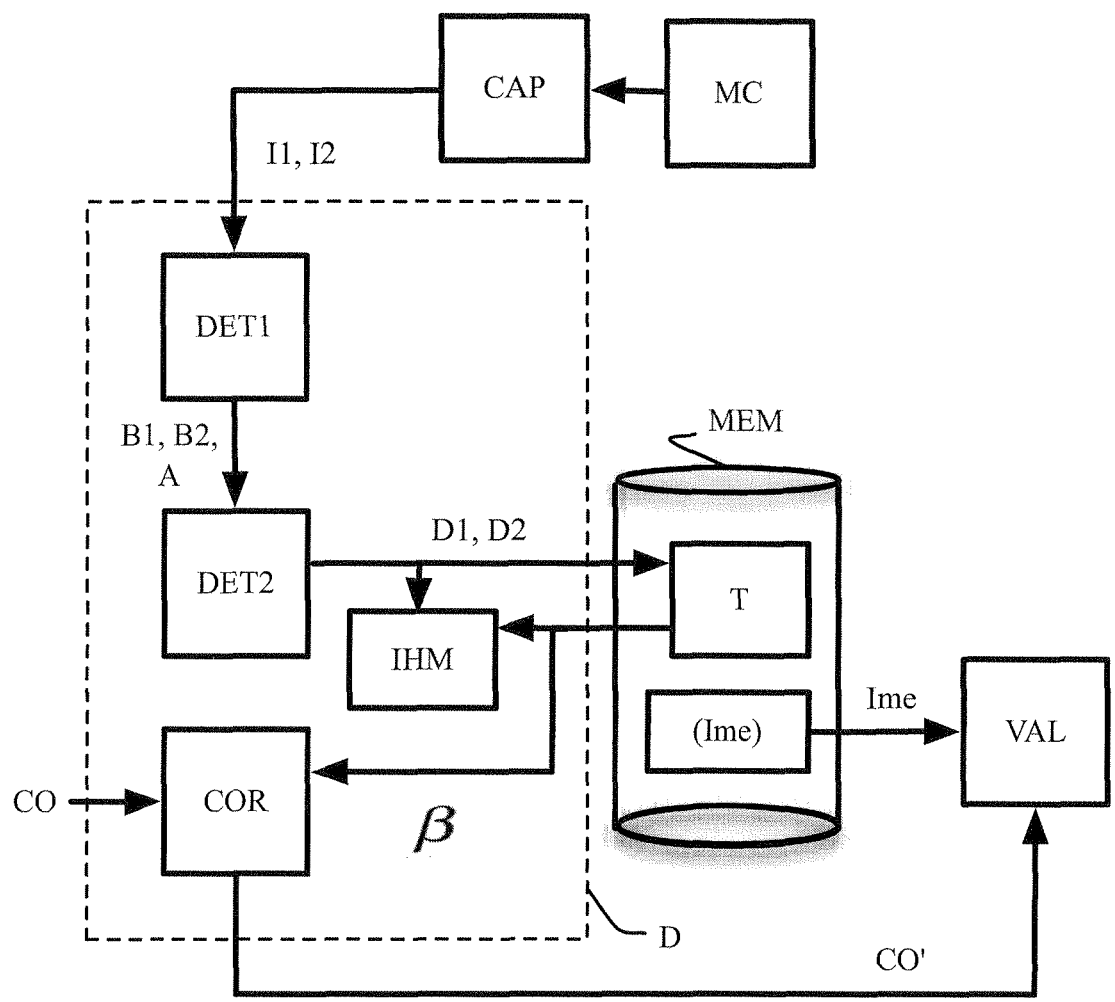

The features of the invention mentioned above, as well as others, will emerge more clearly from a reading of the following description of an example embodiment, said description being given in relation to the accompanying drawings, among which:

FIGS. 1a and 1b show a front view of an area of a body of an individual placed on an apposition area on a biometric sensor mounting, FIGS. 2a and 2b show schematically a biometric sensor designed to take a first image of the area of the body by total reflection of radiation on the apposition area and a second image from radiation able to pass through the tissues of the body and be reflected on haemoglobin, FIGS. 3 and 4 illustrate a method of detecting the orientation of an area of the body of an individual placed on an apposition area of a biometric sensor mounting according to the present invention for various orientations of the area DO with respect to the mounting P, and FIG. 5 shows a block diagram of an example of identification equipment that comprises a device according to the present invention.

Biometric sensors are known from the prior art that comprise a mounting P and are designed to form a first image I1 of the area DO of the body of an individual by total reflection of radiation on an apposition area AP of the mounting P, and a second image I2 of the area DO from radiation able to pass through the tissues of the body and be reflected on haemoglobin. The reader can refer for example to the international application filed by the applicant and published under the number WO 2008/129201.

FIGS. 2a and 2b show schematically an example of such a biometric sensor CAP.

The biometric sensor CAP comprises a plate forming a flat mounting P that is at least partially transparent for the electromagnetic radiation used (typically glass or the like) so as to constitute an apposition area AP for the area DO of the body (here the first phalanx of a finger of a hand) of the individual.

Under the mounting P there are arranged a focusing lens L and sensor means C able to detect two electromagnetic radiations having distinct wavelength; either the sensors used are sensitive to these two wavelengths or a double array of sensors sensitive respectively to the two wavelengths is provided.

First illumination means S1 (for example in the form of LEDs) are placed around the lens L and arranged so as to illuminate approximately frontally the area DO of the body placed in contact with the apposition area AP of the mounting P. The first illumination means S1 emit a first light beam F1 comprising radiation having a first wavelength such that the radiation is suitable for not passing through the tissues of the body so that this radiation, once reflected on the apposition area AP, referenced FR1 and shown in broken lines in FIG. 2a, conveys the optical information of the body print. Typically, this wavelength is situated in the red, and is for example around 650 nm.

Second illumination means S2 (for example in the form of LEDs) are arranged so as to illuminate laterally the area DO of the body placed on the apposition area AP of the mounting P. The second illumination means S2 emit a second light beam F2 comprising radiation having a second wavelength such that the radiation is able to pass through the tissues of the body and be reflected by haemoglobin, in other words by the venous network of the area DO. Typically, this wavelength is situated in the near infrared and is for example around 950 nm. The reflected radiation FR2 that conveys the optical information from the venous network of the area DO has been shown in broken lines.

In a variant, it is possible to use single illumination means and/or a prismatic optical element as described in the international application published under the number WO 2008/129201.

In general terms, the present invention concerns a method of detecting the orientation of the area DO of the body of an individual placed on the apposition area AP of a mounting P of a biometric sensor CAP such as the one for example described in relation to FIGS. 2a and 2b.

Following the acquisition of two images I1 and I2 by the sensor CAP or, in a variant, images I1 and I2 previously acquired and stored or data extracted from these two images, the method begins with a step of determination, in a reference frame PI, firstly of two longitudinal edges B1 and B2 of the area of the body depicted on the second image I2 and secondly of the longitudinal axis A of the area of the body depicted on the first image I1. This step is followed by a step of determining the orientation of the area of the body DO with respect to the mounting P from the measurement of the relative positions of the two edges B1, B2 and the axis A thus determined in the reference frame PI.

FIGS. 3 and 4 illustrate this method for different orientations of the area DO with respect to the mounting P.

On the left in FIG. 3, the longitudinal edges B1 and B2 of the area DO depicted on the image I2 are shown schematically, that is to say the longitudinal edges of the representation of the venous network carried by the image I2, and the longitudinal axis A of the body print CO depicted on the image I1. There exist many known ways for determining the edges B1 and B2 from the image I2 and the axis A from the image I1. For example, it is possible to use an encompassing volume determination algorithm the purpose of which is to determine a rectangle encompassing the representation of the venous network carried by the image I2 and another rectangle encompassing the representation of the body print carried by the image I1. The edges B1 and B2 and the axis A are then easily obtained from these rectangles. It is also possible to use a contour point extraction algorithm which, applied to the image I1, defines the contour of the body print from which it is easy to define the longitudinal axis A and which, applied to the image I2, directly determines the edges B1 and B2.

According to one embodiment, the measurement of the relative positions of the two edges B1 and B2 and the axis A is the ratio between two distances D1, D2 each measured in the reference plane PI between the axis A and one of the two edges B1, B2, as illustrated on the right in FIG. 3. The distance D1 is defined between the axis A and an edge B1 and the distance D2 is defined between this axis A and the edge B2.

According to one embodiment, the reference plane PI is an image plane, for example that of the sensor CAP, and the distances D1 and D2 are measured by calculating the number of pixels between the axis A and one of the edges B1, B2.

According to one embodiment, an orientation of the area DO of the body with respect to the mounting P is detected where the distance D1 is not equal to the distance D2 and the sign of the orientation is then given by the sign of the difference D2−D1.

On the right in FIG. 3, the distances D1 and D2 are equal to each other, which corresponds to the case where the placing angle β is zero.

On the left in FIG. 4, the case is shown where the placing angle is positive, that is to say D2>D1, and to the right the case where the placing angle is negative, that is to say D1>D2.

According to one embodiment, an orientation of the area DO of the body with respect to the mounting P is detected when a pair of distances (D1, D2) is not equal to a pair of distances measured previously and representing a reference position of the area DO of the body with respect to the mounting P. This reference position is for example defined during a prior registration phase (enrolment) as explained previously.

According to one embodiment, the placing angle β is determined from a look-up table T between two pairs of measured distances and placing angles predetermined empirically. For example, each placing angle corresponds to differences between the distances D2 and D1 lying between a lower bound and an upper bound: the angle 5° corresponds to differences between the distances D2 and D1 that are non-zero and less than 5 pixels, the value of 10° corresponds to differences between the distances D2 and D1 lying between 6 and 10 pixels, etc.

The method can then comprise, according to one embodiment, a step of correcting the representation of the area DO of the body carried by the first image I1, that is to say the representation CO of the body print, from the sign and the value of the placing angle thus determined. This correction consists, for example, of applying a geometric transformation to the representation CO. This transformation is for example a rotation of the plane that supports this representation CO by an angle equal to the placing angle, a rotation that can be supplemented by a translation so as to obtain a distance D1 equal to the distance D2.

According to one embodiment, the method also comprises a step for indicating to the individual whether the orientation of the area DO of his body with respect to the mounting P is correct for identification. The method can then be designed to request the individual to reposition the area of his body on the apposition area as long as the orientation of this area is not correct, that is to say as long as the distances D1 and D2 are not equal to each other, or are not equal to a pair of distances that defines a reference position.

An example of an installation for identifying an individual according to the present invention is shown in FIG. 5.

The installation comprises a biometric sensor CAP such as for example the one in FIGS. 2a and 2b. In this case, the installation also comprises control means (microcontroller) MC that controls the sensor means 6 and the illumination means S1 and S2 so as to capture, either sequentially or simultaneously, two images I1 and I2, one (I1) representing the body print and the other (I2) representing the venous network.

In addition, the installation comprises storage means MEM in which there are held in memory pairs of data (Imv, Ime) each formed from data Ime extracted from the first image I1 (the image of the body print of the area of the body DO of the individual) and data Imv extracted from the second image I2 (the image of the venous network of the area of the body DO); these pairs of data (Imv, Ime) are captured and put in memory during a preliminary step of registration (enrolment) of an individual, the area of the body DO then occupying a position that is taken as the reference position.

The installation also comprises a device D for detecting the orientation of the area DO of the body of an individual with respect to the mounting P.

According to one embodiment, the device D is integrated in the sensor CAP and according to another embodiment, as illustrated in FIG. 5, the device D is separate from this sensor.

The device D comprises means DET1 for determining in the reference frame PI firstly the longitudinal axis A of the area of the body DO depicted in the first image I1 and secondly two longitudinal edges B1 and B2 of the area of the body depicted on a second image I2. For example, this reference frame PI is given by superimposition of the two images I1 and I2 and then defined on the same image plane and the instructions of a computer program are then implemented in order to extract the edges B1 and B2 and the axis A as explained previously.

The device D also comprises means DET2 for determining the orientation of the area of the body DO with respect to the mounting P from the measurement of the relative positions of the two edges B1 and B2 and the axis A thus determined in the reference frame PI.

The means DET1 and DET2 are, according to one embodiment, used by a computer program stored on an information carrier, such as for example the memory MEM, said program then comprising instructions for implementing one of the above detection methods when it is loaded into and executed by the device D provided for this purpose with computing and memory means, not shown in FIG. 5.

According to one embodiment, the device D also comprises means COR for correcting the depiction CO as explained previously.

According to one embodiment, the memory MEM also comprises a look-up table T between pairs of distances measured and placing angles predetermined empirically. Thus, when the distances D1 and D2 have been determined by the means DET2, these distances are sent to the memory MEM, which returns a placing angle to the means COR.

According to one embodiment, the device D also comprises a graphical interface IHM that is provided for indicating to the individual whether the orientation of the area of his body with respect to the mounting O is correct for identification. This interface IHM can also be provided for indicating the sign and/or the value of the placing angle and/or the distances issuing from the means DET2.

To enable the individual to be identified, the installation also comprises a validation unit VAL that is designed to receive the representation CO of the body print carried by the first image I1 or, according to one embodiment, a modified version CO' of this representation that came from the means COR, and data Ime of the body print held in memory in the storage means MEM, in order to compare either the representation CO or the representation CO' with said data Ime and to deliver a signal representing the result of the comparison, in particular a validation or invalidation (for example a confirmation or non-confirmation of identity, granting or refusal or access, etc.).

Thus, according to this example installation, the mapping of the venous network is simply exploited as an ancillary criterion able to determine the placing angle of the area DO of the body on the apposition area AP and the image of the body print CO or its corrected version CO', according to one embodiment, remains the unique identification criterion. Other exploitations of the images acquired of the body print and of the venous network can be used for identifying the individual without for all that departing from the scope of the present invention.

The invention claimed is:
1. Method for identifying an individual by reading a body print and a venous network taken on an area of a body of said individual, said method comprising:
placing said area of said body on an apposition area of a biometric sensor mounting, forming a first image of the area of the body by total reflection of radiation on the apposition area, forming a second image of the area of the body from radiation able to pass through the tissues of the body and to be reflected on haemoglobin, comparing said first and second images thus formed with corresponding images formed during a prior registration phase, determining in a reference frame
firstly the longitudinal axis of the area of the body depicted in the first image and secondly two longitudinal edges of the area of the body depicted in the second image, determining the value and the sign of the placing angle formed between the transverse axis of the area of the body and the mounting from the measurement of the relative positions of the two edges and the axis thus determined in the reference frame, and correcting a representation of the area of the body carried by said first image from said value and said sign thus determined.

2. Method according to claim 1, in which the measurement of the relative positions of the two edges and the axis is the ratio between two distances each measured in the reference frame between the axis and one of the two edges.

3. Method according to claim 2, in which the value of the placing angle formed between the transverse axis of the area of the body with respect to the mounting is determined from said two distances and the sign of said angle is then given by the sign of the difference between these two distances.

4. Method according to claim 3, in which the placing angle formed between the transverse axis of the area of the body and the mounting is determined from a look-up table between pairs of distances measured and placing angles predetermined empirically.

5. Method according to claim 1, which comprises indicating to an individual having placed an area of his body on the apposition area of said biometric sensor mounting whether the placing angle of the area of his body with respect to the mounting is correct for his identification.

6. Method for identifying an individual by reading a body print and a venous network taken on an area of a body of said individual, said method comprising:

placing said area of said body on an apposition area of a biometric sensor mounting, forming a first image of the area of the body by total reflection of radiation on the apposition area, forming a second image of the area of the body from radiation able to pass through the tissues of the body and to be reflected on haemoglobin, comparing said first and second images thus formed with corresponding images formed during a prior registration phase, determining in a reference frame
firstly the longitudinal axis of the area of the body depicted in the first image and secondly two longitudinal edges of the area of the body depicted in the second image, determining the value and the sign of the placing angle formed between the transverse axis of the area of the body and the mounting from the measurement of the relative positions of the two edges and the axis thus determined in the reference frame, and indicating to an individual having placed an area of his body on the apposition area of said biometric sensor mounting whether the placing angle of the area of his body with respect to the mounting is correct for his identification in order for him to reposition it.

7. Method according to claim 6, in which the measurement of the relative positions of the two edges and the axis is the ratio between two distances each measured in the reference frame between the axis and one of the two edges.

8. Method according to claim 7, in which the value of the placing angle formed between the transverse axis of the area of the body with respect to the mounting is determined from said two distances and the sign of said angle is then given by the sign of the difference between these two distances.

9. Method according to claim 8, in which the placing angle formed between the transverse axis of the area of the body and the mounting is determined from a look-up table between pairs of distances measured and placing angles predetermined empirically.

10. Method according to claim 7, in which an orientation of the area of the body with respect to the mounting is detected as non correct when the two distances are not equal to two other distances measured previously and representing a reference position of the area of the body with respect to the mounting.

11. Equipment for identifying an individual by reading a body print and of a venous network taken on an area of a body of said individual, said equipment comprising a biometric sensor provided with a mounting for an individual to place an area of his body, said biometric sensor being provided for forming a first image of the area of a body placed on the apposition area by total reflection of radiation from a first source and for forming a second image of said area from radiation of a second source able to pass through the tissues of the body and to be reflected on haemoglobin, and comprising circuitry configured for comparing said first and second images thus formed with corresponding images formed during a prior registration phase, wherein the equipment further comprises a device for detecting the orientation of the area of the body of an individual with respect to the mounting, said device comprising circuitry configured for determining the longitudinal axis of the area of the body depicted in a first image formed by said biometric sensor and determining two longitudinal edges of the area of the body depicted in a second image formed by said biometric sensor, determining the value and the sign of the placing angle formed between the transverse axis of the area of the body and the mounting from the measurement of the relative positions of the two edges and the axis thus determined in the reference frame, and correcting a representation of the area of the body carried by said first image from said value and said sign thus determined.

12. Equipment for identifying an individual by reading a body print and of a venous network taken on an area of a body of said individual, said equipment comprising a biometric sensor provided with a mounting for an individual to place an area of his body, said biometric sensor being provided for forming a first image of the area of a body placed on the apposition area by total reflection of radiation from a first source and for forming a second image of said area from radiation of a second source able to pass through the tissues of the body and to be reflected on haemoglobin, and comprising circuitry configured for comparing said first and second images thus formed with corresponding images formed during a prior registration phase,
wherein the equipment further comprises a device for detecting the orientation of the area of the body of an individual with respect to the mounting, said device comprising circuitry configured for
determining the longitudinal axis of the area of the body depicted in a first image formed by said biometric sensor and
determining two longitudinal edges of the area of the body depicted in a second image formed by said biometric sensor,
determining the value and the sign of the placing angle formed between the transverse axis of the area of the body and the mounting from the measurement of the relative positions of the two edges and the axis thus determined in the reference frame, and
indicating to an individual having placed an area of his body on the apposition area of said biometric sensor mounting whether the placing angle of the area of his body with respect to the mounting is correct for his identification in order for him to reposition it.

* * * * *